United States Patent [19]

Hanson

[11] Patent Number: 4,918,259
[45] Date of Patent: Apr. 17, 1990

[54] ELECTRICAL OUTLET BOX EXTENSION COVER

[76] Inventor: William L. Hanson, P.O. Box 7192, Tacoma, Wash. 98407

[21] Appl. No.: 235,030

[22] Filed: Aug. 19, 1988

[51] Int. Cl.$^4$ ............................................. H02G 3/14
[52] U.S. Cl. ...................................... 174/66; 174/57; 439/536
[58] Field of Search ................................ 439/535–539, 439/544, 550, 552, 553, 562, 569, 570; 248/DIG. 6; 174/57, 66; 220/3.7

[56] References Cited

U.S. PATENT DOCUMENTS

| | | | |
|---|---|---|---|
| 3,662,085 | 5/1972 | Robinson et al. | 439/538 |
| 3,814,834 | 6/1974 | Glader | 220/3.7 |
| 4,180,303 | 12/1979 | Damsky | 439/652 |
| 4,603,931 | 8/1986 | Ruffman | 439/536 |

FOREIGN PATENT DOCUMENTS 269975  4/1969  German Democratic Rep. ... 174/57

*Primary Examiner*—Gary F. Paumen

[57] ABSTRACT

A cover for existing electrical outlets which brings the outlet cover flush with newly resheeted walls without moving the existing electrical outlet.

2 Claims, 2 Drawing Sheets

ELECTRICAL OUTLET BOX EXTENSION COVER

BACKGROUND OF THE INVENTION

When an area is being remodeled, it is often necessary to resheet the walls. When the walls are resheeted, the electrical outlets are recessed unless each outlet is disengaged and brought forward to be flush with the newly installed wallboard.

A number of previous patents have disclosed means for extending receptacles of an outlet box.

Thus, in application Ser. No. 3,609,647 by Castellano, a second plug receptacle is extended from a initial receptacle.

Similarly, in U.S. Pat. No. 4,180,303 by Damsky, a plug-in electrical receptacle extender is disclosed. The plug-in receptacle extender is designed to project through an opening in panelling. Thus, as in the Castellano patent, the invention is utilization of two receptacles to extend the length of the initial receptacle.

In the present invention, the receptacle plug-in is not extended out flush with the wall. Instead, the cover and asthetic coverings are extended to be flush with the newly installed wallboard.

SUMMARY OF THE INVENTION

The present invention utilizes a first cover extension which is affixed to a standard outlet box. The cover extension utilizes four extending walls. A second rectangular cover frame is position to fit within the first cover extension box. Thus, the first extension is screwed securely into position and the second frame is secured to the first extension, thereby establishing an asthetic and safe extension of the box to coincide with the newly resheeted walls.

The intent of the present invention is not to extend the receptacles, but rather to extend the cover and allow the original receptacles in regard to the resheeted walls to remain the same.

DETAILED DESCRIPTION OF THE DRAWINGS

Figure 1:
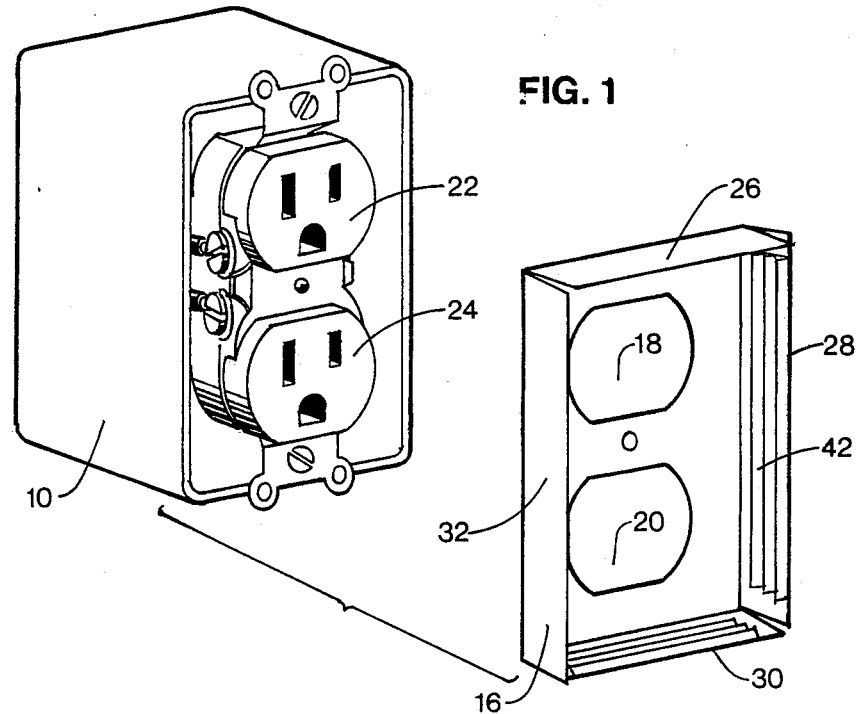
FIG. 1 is a perspective view of the standard outlet box with a cover extinsion about to be positioned over the outlet box.
Figure 3:
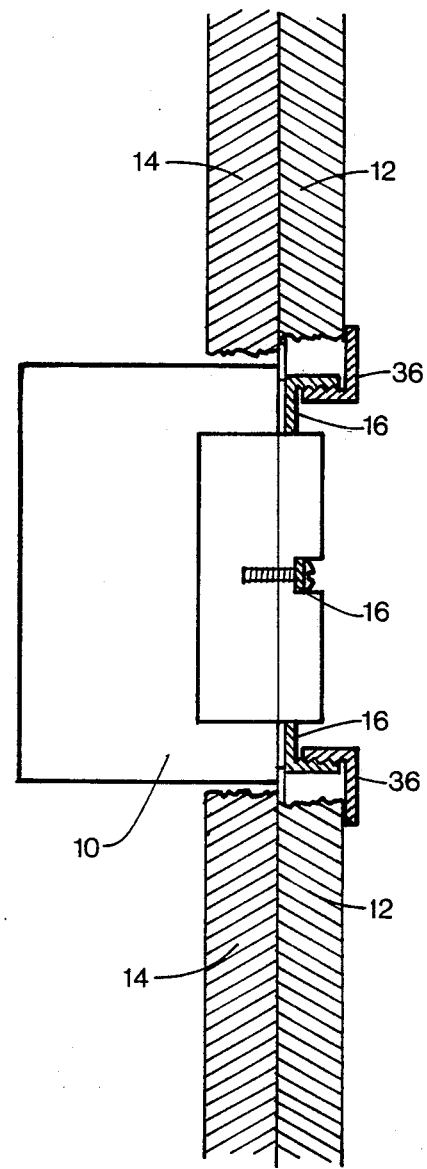
FIG. 3 is a cut-away side view of the standard box with the cover extension and rectangular cover frame secured in position.

In FIG. 1, a standard outlet box 10 is shown secured in position with no cover frame. New wallboard 12 as shown in FIG. 3 is positioned over original wallboard 14 thereby causing the standard outlet to be recessed.

Cover extension 16 is configured to be affixed to the standard outlet receptacles on outlet box 10. In the preferred emobidment, the cover extension 16 is screwed to the standard outlet box 10. The cover extension includes cutouts 18 and 20. The cutouts 18 and 20 correspond to the standard electrical receptacles 22 and 24, thereby allowing the user to insert electrical plugs into the receptacles 22 and 24.

Extending from the cover extension 16 are four outer extending walls 26, 28, 30 and 32. The outer extending walls are of the approximate depth of the new wallboard 12. Additionally, the extending walls 26, 28, 30 and 32 are made of material which can be easily cut, thereby allowing the user to cut the walls to the approximate length desired. In the preferred embodiment, cutting would only be necessary if the new wallboard 12 was thinner than ⅜". For thicker walls, the cover extension 16 and rectangular cover 36 self-adjust. Serrations 42 are positioned along the inner faces of the extending walls.

Figure 2:
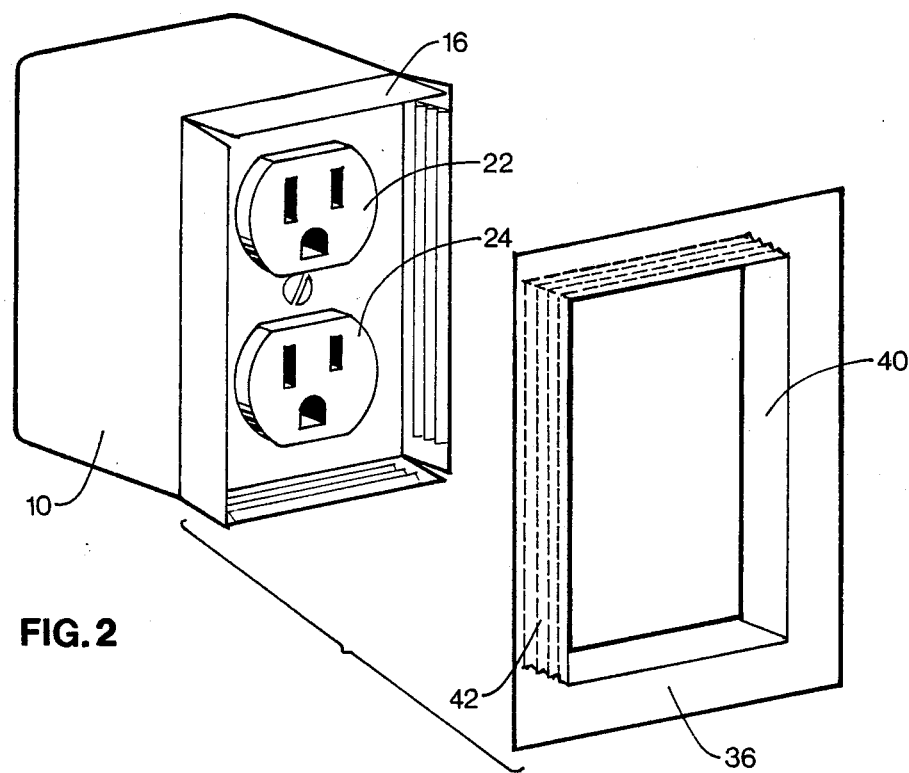
FIG. 2 is a perspective view of the rectangular cover frame about to be secured to the cover extension.

In FIG. 2, the rectangular cover 36 is positioned to fit within the cover frame extension 16.

Extending from the cover frame 36 are inserting walls 40. The inserting walls 40 also include serrations 42 which secure to serrations 34 of the extending walls 26, 28, 30 and 32. The inserting walls 40 also are made of material which can be easily cut, thereby allowing the user to roughly match the depths of the outer extending walls and inserting walls 40.

In FIG. 3 is a side cut-away view of the rectangular cover frame 36 positioned over the new wall board 12. As set forth in the illustration, the standard outlet box receptacle are operationally effective and with the rectangular cover frame 36 in place they are aesthetically pleasing

I claim:

1. An extension cover assembly for an electrical outlet box, comprising:
   a cover capable of covering an electrical outlet box with cutouts corresponding to electrical receptacles of the electrical outlet box;
   a frame capable of covering wallboard which surrounds the electrical outlet box;
   first walls extending normal to the cover with serrations; and
   second walls extending normal to the frame with serrations on the surfaces thereof that interlock with the serrations on the first walls extending from the cover, thus securing the frame to the cover.

2. The extension cover assembly of claim 1, wherein the walls extending from the frame and cover are easily cut to length.

* * * * *